(12) United States Patent
Jang

(10) Patent No.: US 11,975,722 B2
(45) Date of Patent: May 7, 2024

(54) VEHICLE CONTROL DEVICE AND METHOD, AND VEHICLE SYSTEM

(71) Applicant: HL MANDO CORPORATION, Gyeonggi-do (KR)

(72) Inventor: Jae Hoon Jang, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 150 days.

(21) Appl. No.: 17/512,524

(22) Filed: Oct. 27, 2021

(65) Prior Publication Data

US 2022/0135044 A1 May 5, 2022

(30) Foreign Application Priority Data

Oct. 29, 2020 (KR) .......................... 10-2020-0141768

(51) Int. Cl.
*B60W 40/068* (2012.01)
*B60W 10/18* (2012.01)
(Continued)

(52) U.S. Cl.
CPC .......... *B60W 40/068* (2013.01); *B60W 10/18* (2013.01); *B60W 10/20* (2013.01);
(Continued)

(58) Field of Classification Search
CPC .... B60W 40/068; B60W 10/18; B60W 10/20; B60W 30/02; B60W 2510/202; B60W 2520/26; B60W 2552/40; B60W 2710/18; B60W 2710/20; B60W 30/146; B60W 30/16; B60W 30/18172; B60W 40/105; B60W 2520/10; B60W 2552/00; B60W 40/06; B60W 2540/18; B60W 2556/50;
(Continued)

(56) References Cited

U.S. PATENT DOCUMENTS 3,840,278 A * 10/1974 Fleischer .............. B60T 8/1764
384/377
4,755,945 A * 7/1988 Kade ..................... B60T 8/1764
303/162

(Continued)

FOREIGN PATENT DOCUMENTS

CN          105172791 A   * 12/2015
DE      102017212361 A1   *  1/2019   ............ B60W 30/02
WO     WO-2010019045 A1   *  2/2010   ............ B60T 17/221

OTHER PUBLICATIONS

Brakes brake control and driver assistance (Year: 2014).*
(Continued)

*Primary Examiner* — Jason Holloway
*Assistant Examiner* — Kyle T Johnson
(74) *Attorney, Agent, or Firm* — Ladas & Parry, LLP

(57) ABSTRACT

The present embodiments relate to a vehicle control device and method, and a vehicle system. The vehicle control device may include a determinator determining a road surface condition based on vehicle driving information and determining whether to brake a vehicle based on a result of determining the road surface condition and a vehicle controller controlling a braking device according to a result of determining whether to brake the vehicle by the determinator and controlling a steering device based on control of the braking device.

11 Claims, 14 Drawing Sheets

(51) Int. Cl.
*B60W 10/20* (2006.01)
*B60W 30/02* (2012.01)

(52) U.S. Cl.
CPC ....... *B60W 30/02* (2013.01); *B60W 2510/202* (2013.01); *B60W 2520/26* (2013.01); *B60W 2552/40* (2020.02); *B60W 2710/18* (2013.01); *B60W 2710/20* (2013.01)

(58) Field of Classification Search
CPC ......... B60W 2720/10; B60W 2754/30; B60W 50/0098; B60T 2210/36; B60T 2220/03; B60T 2260/02; B60T 2260/024; B60T 8/1764; B60T 8/176; B60T 2270/10
See application file for complete search history.

(56) References Cited

U.S. PATENT DOCUMENTS

| | | | | |
|---|---|---|---|---|
| 5,646,849 A * | 7/1997 | Walenty | ................ | B60T 8/1764 303/155 |
| 6,000,765 A * | 12/1999 | Hinz | ................ | B60T 8/1764 303/148 |
| 2002/0013646 A1* | 1/2002 | Nishizaki | ............. | B62D 5/0472 180/443 |
| 2003/0074125 A1* | 4/2003 | Walenty | ................ | B60T 8/1764 701/73 |
| 2004/0124701 A1* | 7/2004 | Nihei | ................ | B60T 8/1764 303/163 |
| 2005/0236891 A1* | 10/2005 | Terasaka | ............. | B60T 8/1764 303/113.1 |
| 2006/0074530 A1* | 4/2006 | Meyers | ................ | B60W 10/119 701/1 |
| 2007/0142996 A1* | 6/2007 | Lee | .......... | B60T 7/22 701/96 |
| 2010/0211281 A1* | 8/2010 | Baier-Welt | ............ | B60T 8/1764 701/70 |
| 2011/0264300 A1* | 10/2011 | Tuononen | ............ | B60W 40/068 701/1 |
| 2012/0035820 A1* | 2/2012 | Falkenstein | ..... | B60W 30/18172 903/915 |
| 2013/0076116 A1* | 3/2013 | Sekiya | ................. | B60T 8/1764 303/186 |
| 2015/0224925 A1* | 8/2015 | Hartmann | ............ | B60W 40/068 348/148 |
| 2015/0367855 A1* | 12/2015 | Parchami | ............. | G06V 20/588 701/1 |
| 2017/0137023 A1* | 5/2017 | Anderson | .............. | B60G 17/02 |
| 2017/0349185 A1* | 12/2017 | McNew | ................... | G05B 9/02 |
| 2018/0141550 A1* | 5/2018 | Kelly | ................ | B60W 30/143 |
| 2019/0047550 A1* | 2/2019 | Miki | ........................ | B62K 5/10 |
| 2019/0344796 A1* | 11/2019 | Lian | ............... | B60W 30/18172 |
| 2020/0079381 A1* | 3/2020 | Lombrozo | ............. | B62D 6/003 |
| 2021/0213948 A1* | 7/2021 | Lahti | ................... | G05D 1/0223 |
| 2021/0323571 A1* | 10/2021 | Baehrle-Miller | ..... | B60W 50/14 |
| 2022/0080952 A1* | 3/2022 | Um | ........................ | G01B 17/08 |
| 2022/0314966 A1* | 10/2022 | Henderson | .......... | B60T 8/17551 |

OTHER PUBLICATIONS

Driver response to automatic braking (Year: 2014).*
DE-102017212361-A1 translation (Year: 2019).*
CN-105172791-A translation (Year: 2015).*

* cited by examiner

Mu1　　Mu2

FIG. 7
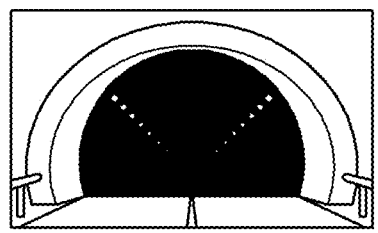
tunnel entrance
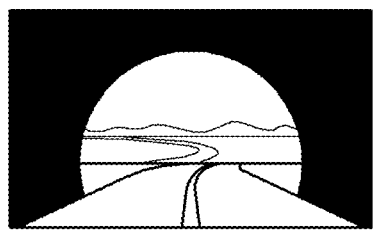
tunnel exit
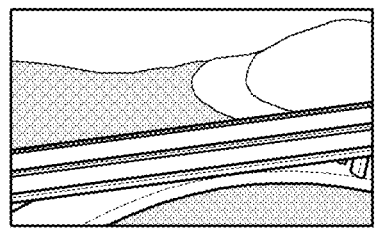
bridge
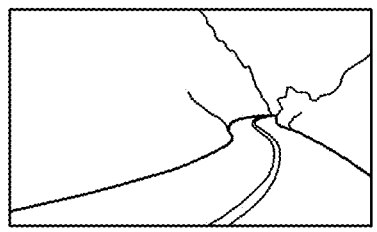
mountain road
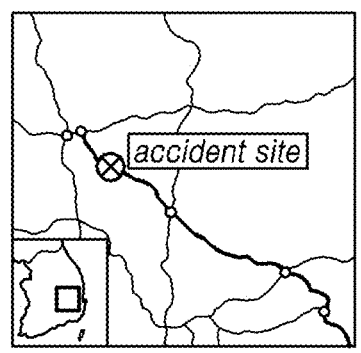
existing black ice accident site

VEHICLE CONTROL DEVICE AND METHOD, AND VEHICLE SYSTEM

CROSS-REFERENCE TO RELATED APPLICATION

This application claims priority from Korean Patent Application No. 10-2020-0141768, filed on Oct. 29, 2020, which is hereby incorporated by reference for all purposes as if fully set forth herein.

BACKGROUND

Field

The present embodiments relate to a vehicle control device and method, and a vehicle system.

Description of Related Art

The vehicle control device may refer to a device for controlling driving of a vehicle and, particularly, it allows the vehicle itself to recognize its surroundings and determine the situation and control the vehicle.

Therefore, demand for vehicle control devices capable of enhancing the stability of vehicles is on the rise.

BRIEF SUMMARY

According to the present embodiments, there may be provided a vehicle control device capable of enhancing the stability of a vehicle.

According to the present embodiments, there may be provided a vehicle control method capable of enhancing the stability of a vehicle.

According to the present embodiments, there may be provided a vehicle system capable of enhancing the stability of a vehicle.

In an aspect, according to the present embodiments, there may be provided a vehicle control device, comprising a determinator determining a road surface condition based on vehicle driving information and determining whether to brake a vehicle based on a result of determining the road surface condition and a vehicle controller controlling a braking device according to a result of determining whether to brake the vehicle by the determinator and controlling a steering device based on control of the braking device, wherein the road surface condition includes at least one road surface condition of a split friction road surface condition or a black ice road surface condition, and wherein the vehicle controller controls an operation of the braking device based on anti-lock braking system (ABS) control if the determinator determines to brake the vehicle and controls an operation of the steering device based on counter steer control.

In another aspect, according to the present embodiments, there may be provided a vehicle control method, comprising determining a road surface condition based on vehicle driving information, determining whether to brake a vehicle according to a result of determining the road surface condition, controlling a braking device according to a result of determining whether to brake the vehicle, and controlling a steering device based on control of the braking device, wherein the road surface condition includes at least one road surface condition of a split friction road surface condition or a black ice road surface condition, and wherein controlling the braking device includes controlling an operation of the braking device based on ABS control if it is determined to brake the vehicle, and wherein controlling the steering device includes controlling an operation of the steering device based on counter steer control.

In another aspect, according to the present embodiments, there may be provided a vehicle system, comprising a sensor device providing vehicle driving information including vehicle state information, a navigation device providing the vehicle driving information including navigation information, a vehicle device including a braking device and a steering device, and a control device determining a road surface condition based on the vehicle driving information, determining whether to brake a vehicle according to a result of determining the road surface condition, controlling the braking device according to a result of determining whether to brake the vehicle, and controlling the steering device based on control of the braking device, wherein the road surface condition includes at least one road surface condition of a split friction road surface condition or a black ice road surface condition, and wherein the control device controls an operation of the braking device based on ABS control if it is determined to brake the vehicle and controls an operation of the steering device based on counter steer control.

According to the present embodiments, it is possible to provide a vehicle control device capable of enhancing the stability of a vehicle.

According to the present embodiments, it is possible to provide a vehicle control method capable of enhancing the stability of a vehicle.

According to the present embodiments, it is possible to provide a vehicle system capable of enhancing the stability of a vehicle.

DESCRIPTION OF DRAWINGS

The above and other objects, features, and advantages of the present disclosure will be more clearly understood from the following detailed description, taken in conjunction with the accompanying drawings, in which:

FIGS. 5, 6, 7, 8, 9, 10, and 11 are views illustrating counter steer control based on the recognition of a split friction road surface condition and a black ice road surface condition;

DETAILED DESCRIPTION

Figure 1:
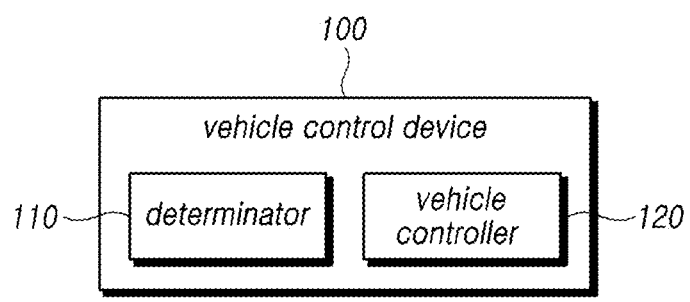
FIG. 1 is a block diagram illustrating a configuration of a vehicle control device according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

It may be readily appreciated by one of ordinary skill in the art that as used herein, the term "road surface" may be interchangeably used with other terms with equivalent meanings, such as "road" or "street," the term "friction" may be interchangeably used with other terms with equivalent meanings, such as "mu" or "friction coefficient."

FIG. 1 is a block diagram illustrating a configuration of a vehicle control device according to the present embodiments.

Referring to FIG. 1, according to the present embodiments, the vehicle control device 100 may include a determinator 110 and a vehicle controller 120. The determinator 110 and the vehicle controller 120 may be connected electrically, magnetically, or mechanically.

According to the present embodiments, a vehicle control device 100 may include a determinator 110 determining a road surface condition based on vehicle driving information and determining whether to brake a vehicle based on a result of determining the road surface condition and a vehicle controller 120 controlling a braking device according to a result of determining whether to brake the vehicle by the determinator 110 and controlling a steering device based on control of the braking device.

The vehicle driving information may include at least one of vehicle state information or navigation information but, without being limited thereto, may include any information related to driving of a vehicle.

The vehicle state information may include vehicle wheel slip information but, without being limited thereto, may include any information indicating the vehicle state.

In particular, the vehicle wheel slip information may include a vehicle left/right wheel slip ratio but, without being limited thereto, may include any information related to a slip of a vehicle wheel. For example, the vehicle left/right wheel slip ratio may be a vehicle left/right wheel peak slip difference.

The navigation information may include at least one of vehicle position information, vehicle slip occurable point information, or date information, but may include any information related to navigation.

In particular, the vehicle position information may include the position value of the vehicle but, without being limited thereto, may include any information related to the position of the vehicle.

In particular, the vehicle slip occurable point information may include the position value of a point where the vehicle may slip but may include any information related to a point where the vehicle may slip.

The vehicle skip occurable point may include at least one of a tunnel point, a bridge point, a mountain road point, or an accident point but, without being limited thereto, may include any point where the vehicle is highly likely to slip.

In particular, the date information may include the value of the date when the vehicle is driving but, without being limited thereto, may include any information as long as it is date information.

The road surface condition may include at least one of a split friction road surface condition or a black ice road surface condition but, without being limited thereto, may include any road surface condition that has a different friction.

Specifically, the determinator 110 may determine the road surface condition based on the vehicle driving information.

According to an embodiment, the determinator 110 may determine whether the road surface condition is the split friction road surface condition.

In other words, the determinator 110 may determine whether the road surface condition is the split friction road surface condition by comparing the vehicle left/right wheel peak slip difference and a preset reference slip value.

The preset reference slip value is a reference slip value (or a reference slip range) for determining the split friction road surface condition and may be varied.

For example, if the difference between the peak slip values of the left and right wheels of the vehicle exceeds the preset reference slip value and maintains a preset reference time, the determinator 110 may determine that the road surface condition is the split friction road surface condition.

If the vehicle left/right wheel peak slip difference is the preset reference slip value or less or if the vehicle left/right wheel peak slip difference exceeds the present reference slip value and fails to maintain the preset reference time, the determinator 110 may determine that the road surface condition is not the split friction road surface condition.

According to an embodiment, the determinator 110 may determine whether the road surface condition is the black ice road surface condition based on at least one of the vehicle wheel slip information, vehicle position information, vehicle slip occurable point information, or date information.

If it is determined based on the vehicle wheel slip information that the road surface condition is the split friction road surface condition, the determinator 110 may determine whether the road surface condition is the black ice road surface condition based on at least one of the vehicle position information, vehicle slip occurable point information, or date information.

The determinator 110 may compare the vehicle left/right wheel peak slip difference and the preset reference slip value, compare the vehicle position value and the vehicle slip occurable point position value, and compare the value of the date when the vehicle is driving and a preset season value, determining whether the road surface condition is the black ice road surface condition.

The preset season value may include spring, summer, fall, or winter but, without being limited thereto, may include any value capable of indicating the climatic state outside the vehicle.

For example, if the vehicle left/right wheel peak slip difference exceeds the preset reference slip value and maintains the preset reference time, the vehicle position value belongs to a specific position range including the vehicle slip occurable point position value, and the value of the date when the vehicle is driving is a winter date value, the determinator 110 may determine that the road surface condition is the black ice road surface condition.

If the vehicle left/right wheel peak slip difference is not more than the preset reference slip value or the vehicle left/right wheel peak slip difference exceeds the preset reference slip value and fails to maintain the preset reference time, or the vehicle position value does not belong to the specific position range including the vehicle slip occurable point position value, or the value of the date when the vehicle is driving does not belong to winter date values, the determinator 110 may determine that the road surface condition is not the black ice road surface condition.

The determinator 110 may determine whether to brake the vehicle according to the result of determining the road surface condition.

In other words, the determinator 110 may determine whether to brake the vehicle depending on the result of determining whether the road surface condition is at least one of the split friction road surface condition or the black ice road surface condition.

For example, if the determinator 110 determines that the road surface condition is at least one of the split friction road surface condition or the black ice road surface condition, the determinator 110 may determine to brake the vehicle.

If the determinator 110 determines that the road surface condition is not the split friction road surface condition or the black ice road surface condition, the determinator 110 may determine not to brake the vehicle.

The vehicle controller 120 may control the vehicle according to the result of determining whether to brake the vehicle.

The vehicle controller 120 may control the braking device according to the result of determining whether to brake the vehicle.

For example, if the determinator 110 determines to brake the vehicle, the vehicle controller 120 may control the operation of the braking device based on anti-lock braking system (ABS) control. If the determinator 110 determines not to brake the vehicle, the vehicle controller 120 may control the braking device to maintain the current state of the vehicle.

The vehicle controller 120 may control the steering device based on the control of the braking device.

If the vehicle controller 120 controls the operation of the braking device based on ABS control according to the determination to brake the vehicle, the vehicle controller 120 may control the operation of the steering device based on counter steer control.

The split friction road surface condition and the black ice road surface condition may include a high friction road surface condition and a low friction road surface condition.

The vehicle controller 120 may determine the steering torque and the steering angle based on the vehicle wheel slip ratio and, based thereupon, control the operation of the steering device to allow the vehicle to counter-steer toward the low friction road surface condition.

If the determinator 110 determines not to brake the vehicle, the vehicle controller 120 may control the steering device to maintain the current state of the vehicle.

The vehicle controller 120 may set the inter-vehicle distance as the maximum distance and set the vehicle speed to the road surface limit speed, thereby controlling the operation of the vehicle. For example, the vehicle controller 120 may fixedly set the inter-vehicle distance to the maximum distance among smart cruise control (SCC) inter-vehicle distances using navigation and SCC and set the vehicle speed (following speed) to be limited to a road surface limit speed, which is resultant from reducing the corresponding road surface limit speed according to navigation by a predetermined ratio, thereby controlling the operation of at least one of the braking device or the steering device.

Navigation may be used to determine the position of the vehicle and obtain ambient environment information and road information on the current road.

Figure 2:
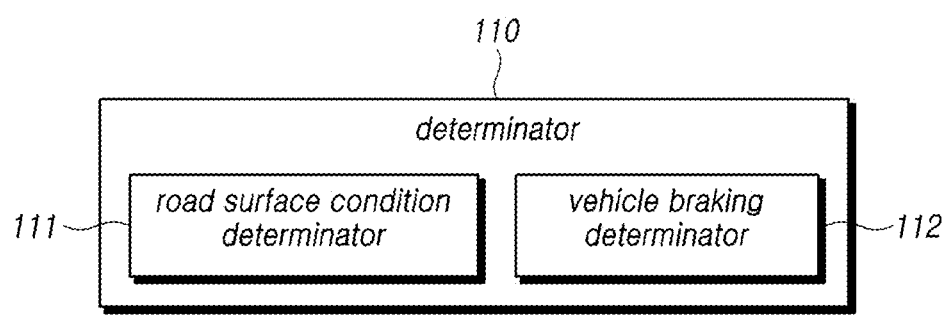
FIGS. 2, 3, and 4 are block diagrams illustrating a configuration of a determinator and a vehicle controller according to the present embodiments.
Figure 3:
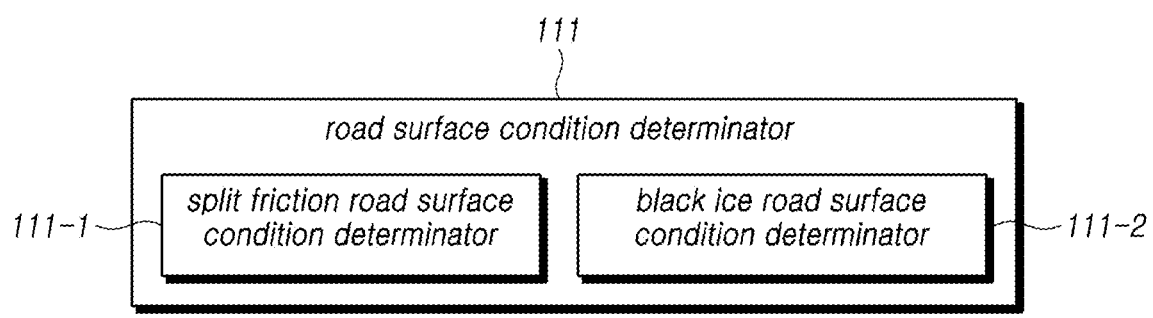
Figure 4:
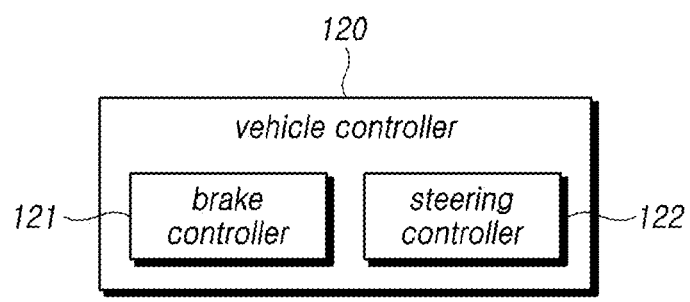

FIGS. 2, 3, and 4 are block diagrams illustrating a configuration of a determinator and a vehicle controller according to the present embodiments.

Referring to FIG. 2, according to the present embodiments, the determinator 110 may include at least one of a road surface condition determinator 111 or a vehicle braking determinator 112. The road surface condition determinator 111 and the vehicle braking determinator 112 may be connected electrically, magnetically, or mechanically.

The road surface condition determinator 111 may determine the road surface condition based on the vehicle driving information.

The vehicle braking determinator 112 may determine whether to brake the vehicle according to the result of determining the road surface condition by the road surface condition determinator 111.

Referring to FIG. 3, according to the present embodiments, the road surface condition determinator 111 may include at least one of a split friction road surface condition determinator 111-1 or a black ice road surface condition determinator 111-2. The split friction road surface condition determinator 111-1 and the black ice road surface condition determinator 111-2 may be connected electrically, magnetically, or mechanically.

The split friction road surface condition determinator 111-1 may determine whether the road surface condition is the split friction road surface condition.

The black ice road surface condition determinator 111-2 may determine whether the road surface condition is the black ice road surface condition based on at least one of the vehicle wheel slip information, vehicle position information, vehicle slip occurable point information, or date information.

If the split friction road surface condition determinator 111-1 determines that the road surface condition is the split friction road surface condition based on the vehicle wheel slip information, the black ice road surface condition determinator 111-2 may determine whether the road surface condition is the black ice road surface condition based on at least one of the vehicle position information, vehicle slip occurable point information, or date information.

Referring to FIG. 4, according to the present embodiments, the vehicle controller 120 may include at least one of a brake controller 121 or a steering controller 122. The brake controller 121 and the steering controller 122 may be connected electrically, magnetically, or mechanically.

The brake controller 121 may control the braking device according to the result of determining whether to brake the vehicle.

The steering controller 122 may control the steering device based on the control of the braking device.

Referring to FIGS. 2 to 4, no duplicate description is given below since specific functions for the road surface condition determinator 111 including the split friction road surface condition determinator 111-1 and the black ice road surface condition determinator 111-2, the vehicle braking determinator 112, the brake controller 121, and the steering controller 122 have been described above in connection with FIG. 1.

FIGS. 5, 6, 7, 8, 9, 10, and 11 are views illustrating counter steer control based on the recognition of a split friction road surface condition and a black ice road surface condition.

Figure 5:
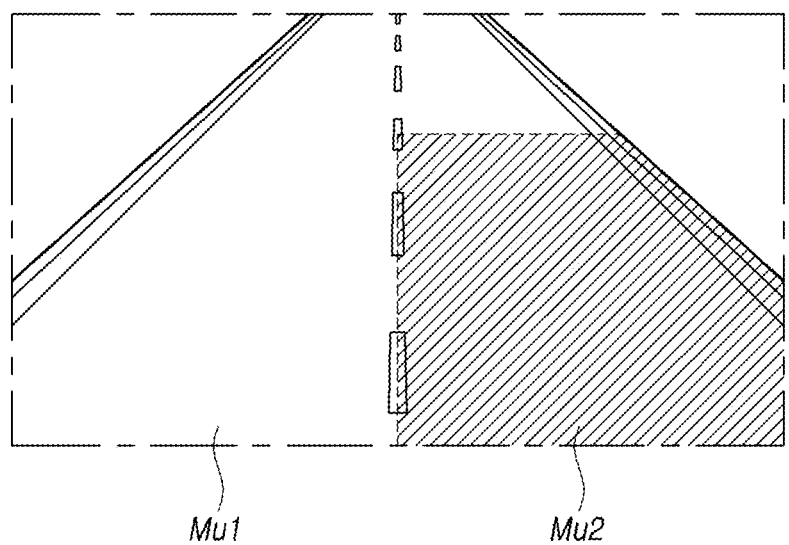

Referring to FIG. 5, the split friction road surface condition may mean a road surface condition having portions Mu1 and Mu2 having different frictions.

Figure 6:
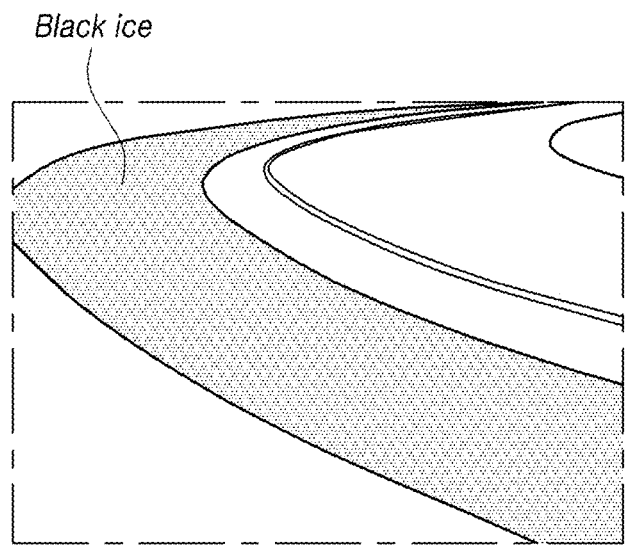

Referring to FIG. 6, the black ice road surface condition may mean a state in which a thin ice layer is formed on the road surface as if it is laminated on the road surface. This may include a phenomenon in which snow and moisture are mingled with dust and smoke in the air and infiltrate through the cracks in the asphalt surface and then frozen in black.

Referring to FIG. 7, the split friction road and the black ice road may mainly occur in shady, low-temperature places, such as a tunnel entrance, a tunnel exit, a bridge, a mountain road, and an existing black ice accident site.

Figure 8:
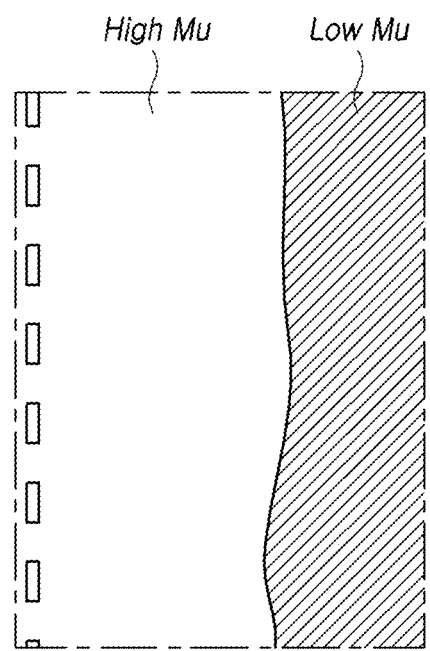

Referring to FIG. 8, the split friction road condition and the black ice road condition may include a high Mu road condition and a low Mu road condition.

Figure 9:
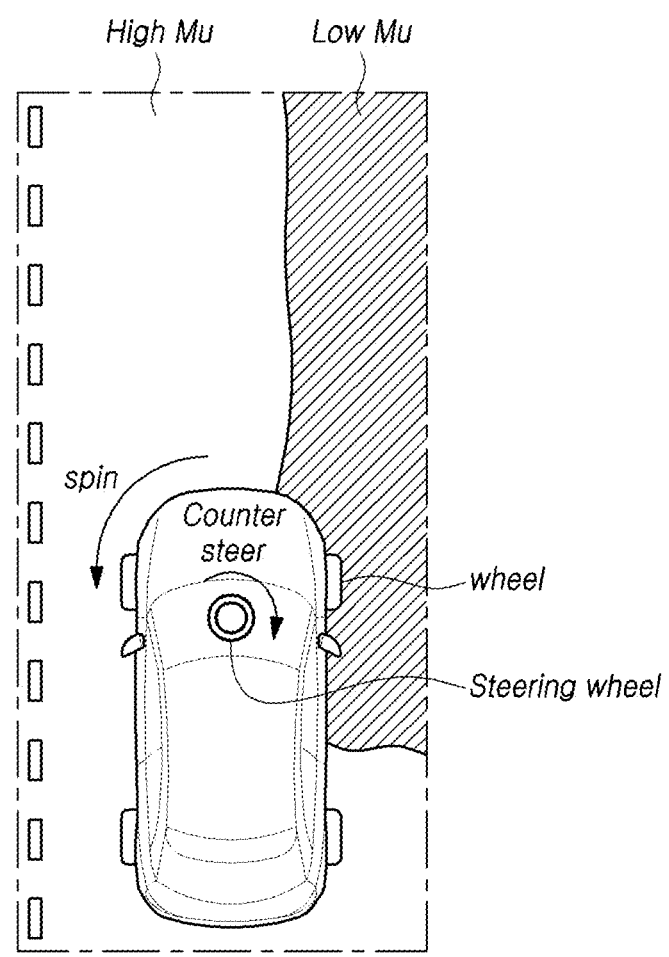

Referring to FIG. 9, if one wheel of the vehicle comes into contact with the black ice, i.e., low Mu, road, while driving, the vehicle may spin to the high Mu road. In this case, the vehicle control device according to the present embodiments may perform counter steer control toward the black ice, i.e., low Mu, road.

Figure 10:
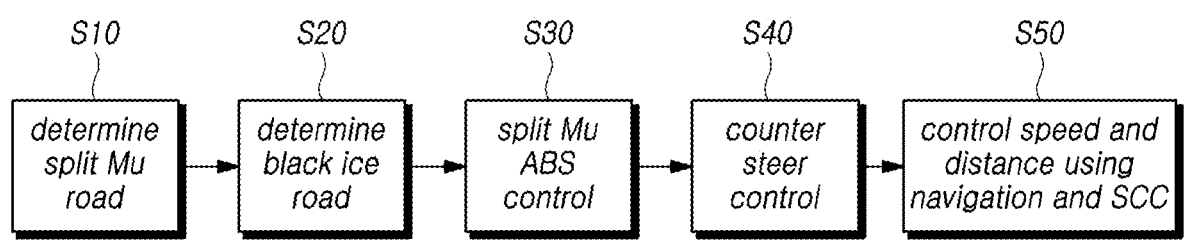

Referring to FIG. 10, if the vehicle control device according to the present embodiments determines the split friction road surface condition and the black ice road surface condition, the vehicle control device may prevent the vehicle from spinning out in association with the ABS split Mu situation by preemptive control on the vehicle, thereby enhancing the stability of the vehicle.

In other words, if a wheel of the vehicle comes in contact with the split friction road and black ice road when the road surface condition is the split friction road surface condition and the black ice road surface condition, the steering wheel of the vehicle may be turned regardless of the driver's intention. The vehicle control device according to the present embodiments may recognize it and perform counter steer control and ABS control in association with, e.g., navigation, camera, and radar, thereby preventing the vehicle from spinning out and hence enhancing the stability of the vehicle.

In step S10, the split Mu road condition may be determined. For example, if the difference between the left and right slips of the vehicle exceeds a threshold and intermittently occurs, it may be determined as the split Mu road condition.

Specifically, if the difference between the left/right wheel peak slips of the vehicle is maintained as being over a preset reference slip value (X %) for a predetermined time (X ms), it may be determined as the split Mu road condition.

In step S20, the black ice road condition may be determined. For example, if the road condition is determined as the split Mu road condition, it may be determined whether the vehicle is near a tunnel entrance/exit, bridge, mountain road, or an existing black ice accident site based on the position information for the vehicle, and the season in the place where the vehicle is currently driving may be determined using, e.g., time information, such as date information.

Thus, if the road condition is the split Mu road condition, the vehicle is near a tunnel entrance/exit, bridge, mountain road, or an existing black ice accident site, and the season in the place where the vehicle is currently driving is winter, it may be determined as the black ice road condition.

In step S30, split Mu ABS control may be performed. In other words, it is possible to control the wheel ABS operation by performing control according to the left/right wheel slip (vehicle speed-wheel speed) difference of the vehicle.

Figure 11:
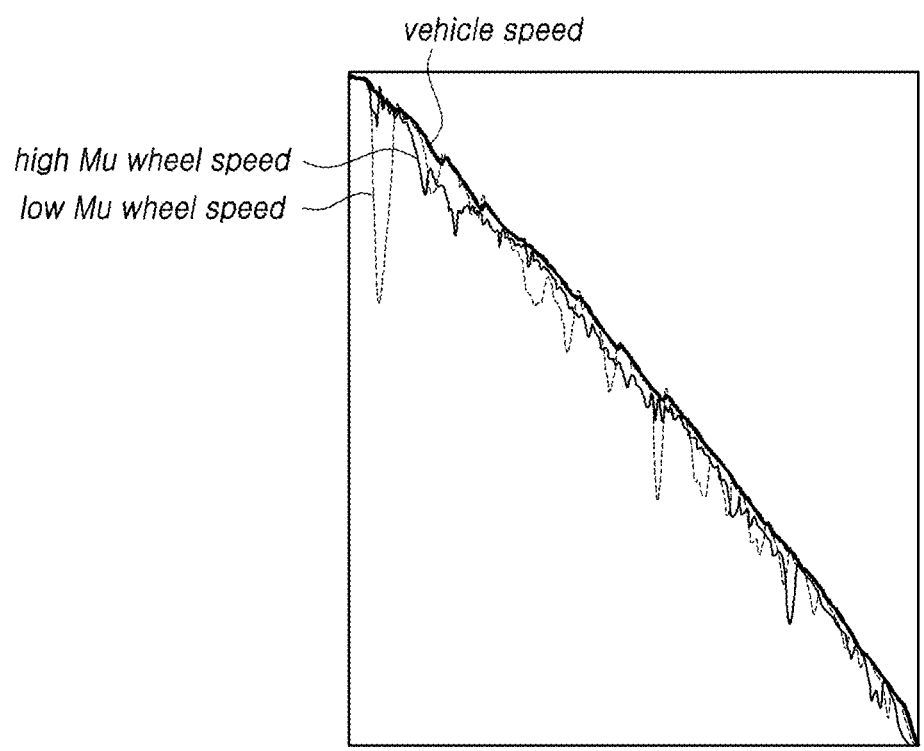

In step S40, counter steer control may be performed. For example, torque control or angle control may be performed according to the amount of slip as shown in FIG. 11, in the direction of the high Mu road condition or the low Mu road condition.

Here, the control according to the direction of the high Mu road condition or the low Mu road condition may control the operation of the steering device to counter-steer the steering wheel toward the black ice road, i.e., in the direction of the low Mu road condition, when one wheel of the vehicle comes in contact with the split friction road and black ice road while the vehicle is driving and thus the vehicle is spun to the opposite side, i.e., the high Mu road condition direction. In this case, the vehicle controller may determine the steering torque and the steering angle based on the vehicle wheel peak slip ratio and, based thereupon, control the operation of the steering device to allow the vehicle to counter-steer toward the low friction road surface condition. For example, if the vehicle wheel peak slip ratio is 20%, the vehicle controller may determine a steering torque of 20 N and/or a steering angle of 20 degrees and, based thereupon, control the operation of the steering device to allow the vehicle to counter-steer toward the low friction road condition direction.

In step S50, speed and distance control may be performed using navigation and SCC. For example, the vehicle speed in the current section may be limitedly set to the road surface limit speed, and the inter-vehicle distance may be fixedly set in association with navigation and SCC, and the operation of the vehicle may be controlled. In other words, it is possible to fixedly set the inter-vehicle distance to the maximum distance among smart cruise control (SCC) inter-vehicle distances and set the vehicle speed (following speed) to be limited to a road surface limit speed, which is resultant from reducing the corresponding road surface limit speed according to navigation by a predetermined ratio, thereby controlling the operation of at least one of the braking device or the steering device.

Navigation may be used to determine the position of the vehicle and obtain ambient environment information and road information on the current road.

Figure 12:
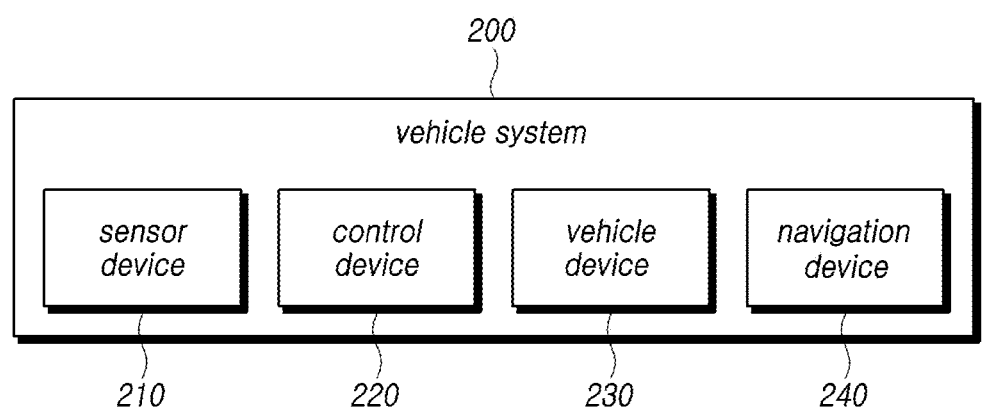
FIG. 12 is a view illustrating a vehicle system according to the present embodiments.

FIG. 12 is a view illustrating a vehicle system according to the present embodiments.

Referring to FIG. 12, according to the present embodiments, a vehicle system 200 may include at least one of a sensor device 210, a control device 220, a vehicle device 230, or a navigation device 240. The sensor device 210, the control device 220, the vehicle device 230, and the navigation device 240 may be connected by at least one of an electrical, magnetic, or mechanical connection.

According to the present embodiments, the vehicle system 200 may comprise a sensor device 210 providing vehicle driving information including vehicle state information, a navigation device 240 providing the vehicle driving information including navigation information, a vehicle device 230 including a braking device and a steering device, and a control device 220 determining a road surface condition based on the vehicle driving information, determining whether to brake a vehicle according to a result of determining the road surface condition, controlling the braking device according to a result of determining whether to brake the vehicle, and controlling the steering device based on control of the braking device.

The sensor device 210 may provide vehicle driving information including vehicle state information. For example, the sensor device 210 may include a state measuring sensor but, without being limited thereto, may include any sensor that is capable of measuring the vehicle driving information (e.g., a camera sensor, a radar sensor, a lidar sensor, an ultrasonic sensor, a temperature sensor, or a climate sensor).

The state measuring sensor may measure the state of the vehicle to obtain vehicle state information. The state measuring sensor may include at least one of a speed sensor (e.g., a vehicle wheel speed sensor) or an acceleration (G) sensor but, without being limited thereto, may include any sensor that is capable of obtaining vehicle state information. In particular, the speed sensor may include a vehicle wheel speed sensor.

The navigation device 240 may provide vehicle driving information including navigation information. Here, the navigation device 240 may mean any device capable of providing information related to driving of a vehicle.

The control device 220 may control the vehicle device 230 based on the vehicle driving information. Since the control device 220 may perform all the functions of the vehicle control device 100 described above, all of the functions of the vehicle control device 100 may be applied to the control device 220.

The vehicle control device 100 and the control device 220 may include an electronic control unit (ECU) but, without limitations thereto, may include any control device 220 (or system) that may perform electronic control.

The operation of the vehicle device 230 may be controlled by the control device 220. The vehicle device 230 may include at least one of a power generating device, a power transmission device, a suspension device, a steering device, a braking device, or an electric device but, without being limited thereto, may include any device related to the vehicle.

A vehicle control method according to the present embodiments is described below with reference to the accompanying drawings. The vehicle control method according to the present embodiments may be performed through the vehicle control device and the vehicle system. For simplicity of description, no duplicate description is given below of the vehicle control device and the vehicle system described above in connection with FIGS. 1 to 12.

Figure 13:
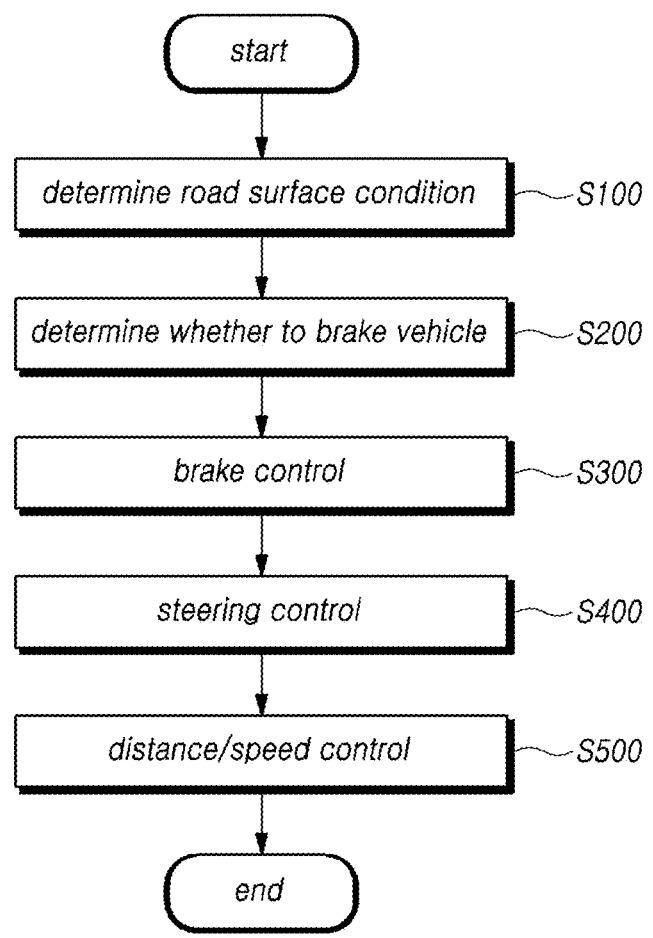
FIG. 13 is a flowchart illustrating a vehicle control method according to the present embodiments.

FIG. 13 is a flowchart illustrating a vehicle control method according to the present embodiments.

Referring to FIG. 13, according to the present embodiments, a vehicle control method may include at least one of a road surface condition determination step S100, a vehicle braking determination step S200, a brake control step S300, a steering control step S400, or a distance/speed control step S500.

According to the present embodiments, the vehicle control method may include determining a road surface condition based on vehicle driving information, determining whether to brake a vehicle based on a result of determining the road surface condition, controlling a braking device according to a result of determining whether to brake the vehicle, and controlling a steering device based on control of the braking device.

First, the road surface condition may be determined based on the vehicle driving information (S100).

According to an embodiment, it may be determined whether the road surface condition is the split friction road surface condition.

In other words, it may be determined whether the road surface condition is the split friction road surface condition by comparing the vehicle left/right wheel peak slip difference and a preset reference slip value.

For example, if the difference between the peak slip values of the left and right wheels of the vehicle exceeds the preset reference slip value and maintains a preset reference time, it may be determined that the road surface condition is the split friction road surface condition.

If the vehicle left/right wheel peak slip difference is the preset reference slip value or less or if the vehicle left/right wheel peak slip difference exceeds the present reference slip value and fails to maintain the preset reference time, it may be determined that the road surface condition is not the split friction road surface condition.

According to an embodiment, it may be determined whether the road surface condition is the black ice road surface condition based on at least one of the vehicle wheel slip information, vehicle position information, vehicle slip occurable point information, or date information.

If it is determined based on the vehicle wheel slip information that the road surface condition is the split friction road surface condition, it may be determined whether the road surface condition is the black ice road surface condition based on at least one of the vehicle position information, vehicle slip occurable point information, or date information.

It is possible to compare the vehicle left/right wheel peak slip difference and the preset reference slip value, compare the vehicle position value and the vehicle slip occurable point position value, and compare the value of the date when the vehicle is driving and a preset season value, determining whether the road surface condition is the black ice road surface condition.

For example, if the vehicle left/right wheel peak slip difference exceeds the preset reference slip value and maintains the preset reference time, the vehicle position value belongs to a specific position range including the vehicle slip occurable point position value, and the value of the date when the vehicle is driving is a winter date value, it may be determined that the road surface condition is the black ice road surface condition.

If the vehicle left/right wheel peak slip difference is not more than the preset reference slip value or the vehicle left/right wheel peak slip difference exceeds the preset reference slip value and fails to maintain the preset reference time, or the vehicle position value does not belong to the specific position range including the vehicle slip occurable point position value, or the value of the date when the vehicle is driving does not belong to winter date values, it may be determined that the road surface condition is not the black ice road surface condition.

Then, it may be determined whether to brake the vehicle according to the result of determining the road surface condition (S200).

In other words, it may be determined whether to brake the vehicle depending on the result of determining whether the road surface condition is at least one of the split friction road surface condition or the black ice road surface condition.

For example, if it is determined that the road surface condition is at least one of the split friction road surface condition or the black ice road surface condition, it may be determined to brake the vehicle.

If it is determined that the road surface condition is not the split friction road surface condition or the black ice road surface condition, it may be determined not to brake the vehicle.

Thereafter, the vehicle may be controlled according to the result of determining whether to brake the vehicle (S300, S400, and S500).

First, the braking device may be controlled according to the result of determining whether to brake the vehicle (S300).

For example, if it is determined to brake the vehicle, the operation of the braking device may be controlled based on ABS control. If it is determined not to brake the vehicle, the braking device may be controlled to maintain the current state of the vehicle.

Then, the steering device may be controlled based on control of the braking device (S400).

If the operation of the braking device is controlled based on ABS control according to the determination to brake the vehicle, the operation of the steering device may be controlled based on counter steer control.

The steering torque and the steering angle may be determined based on the vehicle wheel slip ratio and, based thereupon, the operation of the steering device may be controlled to allow the vehicle to counter-steer toward the low friction road surface condition.

If it is determined not to brake the vehicle, the steering device may be controlled to maintain the current state of the vehicle.

Then, the distance and/or speed of the vehicle may be controlled (S500).

The inter-vehicle distance may be set to the maximum distance, and the vehicle speed may be set to the road surface limit speed, thereby controlling the operation of the vehicle. For example, it is possible to fixedly set the inter-vehicle distance to the maximum distance among smart cruise control (SCC) inter-vehicle distances using navigation and SCC and set the vehicle speed (following speed) to be limited to a road surface limit speed, which is resultant from reducing the corresponding road surface limit speed according to navigation by a predetermined ratio, thereby controlling the operation of at least one of the braking device or the steering device.

Navigation may be used to determine the position of the vehicle and obtain ambient environment information and road information on the current road.

Figure 14:
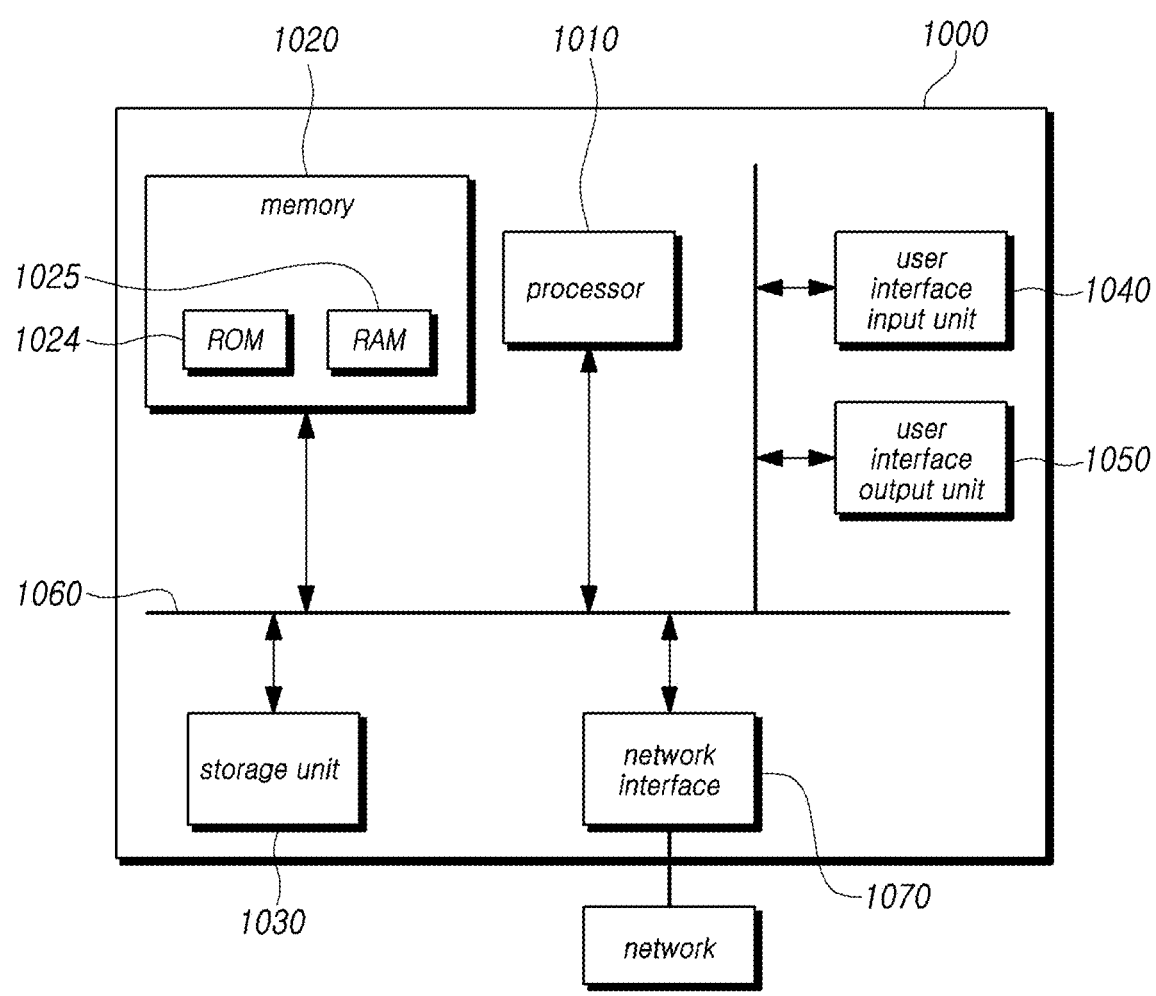
FIG. 14 is a block diagram illustrating a configuration of a computer system of a vehicle control device and a vehicle system according to the present embodiments.

FIG. 14 is a block diagram illustrating a configuration of a computer system of a vehicle control device and a vehicle system according to the present embodiments.

Referring to FIG. 14, the above-described embodiments may be implemented as, e.g., a computer-readable recording medium, in a computer system. As illustrated in the drawings, the computer system 1000, such as a vehicle control device and a vehicle system, may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1024 and a random access memory (RAM) 1025.

Accordingly, the embodiments may be implemented as a non-volatile computer recording medium storing computer-implemented methods or computer executable instructions. The instructions may be executed by the processor to perform a method according to an embodiment of the disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:
1. A vehicle control device, comprising:
a processor configured to determine a road surface condition based on vehicle driving information and determine whether to brake a vehicle based on a result of determining the road surface condition; and
a vehicle controller configured to control a braking device according to a result of determining whether to brake the vehicle by the processor and control a steering device based on control of the braking device,
wherein the road surface condition includes at least one road surface condition of a split friction road surface condition or a black ice road surface condition,
wherein the processor is configured to, if determining that the determined road surface condition is at least one of the split friction road surface condition or the black ice road surface condition, determine to brake the vehicle, wherein the vehicle controller is configured to control an operation of the braking device based on anti-lock braking system (ABS) control if the processor determines to brake the vehicle and control an operation of the steering device based on a counter steer control, wherein the vehicle controller sets an inter-vehicle distance for a smart cruise control to a maximum distance and sets a following speed of the vehicle for the smart cruise control to a road surface limit speed to control the operation of the vehicle, and wherein the processor is configured to, if determining that the determined road surface condition is not at least one of the split friction road surface condition or the black ice road surface condition, determine not to brake the vehicle.

2. The vehicle control device of claim 1, wherein the vehicle driving information includes at least one of vehicle state information or navigation information, wherein the vehicle state information includes vehicle wheel slip information, and the navigation information includes at least one of vehicle position information, vehicle slip occurable point information, or date information.

3. The vehicle control device of claim 2, wherein the vehicle wheel slip information includes a vehicle left/right wheel peak slip difference, and wherein the processor is configured to determine whether the road surface condition is the split friction road surface condition by comparing the vehicle left/right wheel peak slip difference with a preset reference slip value.

4. The vehicle control device of claim 3, wherein the processor is configured to, if the vehicle left/right wheel peak slip difference exceeds the preset reference slip value and maintains a preset reference time, determine that the road surface condition is the split friction road surface condition.

5. The vehicle control device of claim 2, wherein the vehicle wheel slip information includes a vehicle left/right wheel peak slip difference, wherein the vehicle position information includes a vehicle position value, wherein the vehicle slip occurable point information includes a vehicle slip occurable point position value, wherein the date information includes a value of a date when the vehicle is driving, wherein the processor is configured to compare the vehicle left/right wheel peak slip difference with a preset reference slip value, compare the vehicle position value with the vehicle slip occurable point position value, and compare the value of the date when the vehicle is driving with a preset season value to determine whether the road surface condition is the black ice road surface condition.

6. The vehicle control device of claim 5, wherein the processor is configured to, if the vehicle left/right wheel peak slip difference exceeds the preset reference slip value and maintains a preset reference time, and the vehicle position value belongs to a specific position range including the vehicle slip occurable point position value, and the value of the date when the vehicle is driving belongs to a winter date value, determine that the road surface condition is the black ice road surface condition.

7. The vehicle control device of claim 1, wherein the vehicle controller controls the operation of the braking device and the steering device to allow the vehicle to maintain a current state if the processor determines not to brake the vehicle.

8. The vehicle control device of claim 1, wherein the split friction road surface condition and the black ice road surface condition include a high friction road surface condition and a low friction road surface condition, and wherein the vehicle controller determines a steering torque and a steering angle based on a vehicle wheel slip ratio and, based thereupon, controls the operation of the steering device to allow the vehicle to counter-steer toward the low friction road surface condition.

9. A vehicle control method, comprising:

determining a road surface condition based on vehicle driving information;

determining whether to brake a vehicle according to a result of determining the road surface condition;

controlling a braking device according to a result of determining whether to brake the vehicle;

controlling a steering device based on control of the braking device; and setting an inter-vehicle distance for a smart cruise control to a maximum distance and setting a following speed of the vehicle for the smart cruise control to a road surface limit speed to control the operation of the vehicle, wherein the road surface condition includes at least one road surface condition of a split friction road surface condition or a black ice road surface condition, wherein the determining of whether to brake the vehicle according to the result of determining the road surface condition comprises, if it is determined that the determined road surface condition is at least one of the split friction road surface condition or the black ice road surface condition, determining to brake the vehicle, wherein the controlling of the braking device includes controlling an operation of the braking device based on ABS control if it is determined to brake the vehicle, and wherein the controlling of the steering device includes controlling an operation of the steering device based on a counter steer control, and wherein the determining of whether to brake the vehicle according to the result of determining the road surface condition comprises, if it is determined that the determined road surface condition is not at least one of the split friction road surface condition or the black ice road surface condition, determining not to brake the vehicle.

10. The vehicle control method of claim 9, wherein the split friction road surface condition and the black ice road surface condition include a high friction road surface condition and a low friction road surface condition; and wherein controlling the steering device determines a steering torque and a steering angle based on a vehicle wheel slip ratio and, based thereupon, controls the operation of the steering device to allow the vehicle to counter-steer toward the low friction road surface condition.

11. A vehicle system, comprising:

a sensor device providing vehicle driving information including vehicle state information;

a navigation device providing the vehicle driving information including navigation information;

a vehicle device including a braking device and a steering device; and a processor configured to determine a road surface condition based on the vehicle driving information, determine whether to brake a vehicle according to a result of determining the road surface condition, control the braking device according to a result of determining whether to brake the vehicle, and control the steering device based on control of the braking device, wherein the road surface condition includes at least one road surface condition of a split friction road surface condition or a black ice road surface condition, wherein the processor is configured to, if determining that the determined road surface condition is at least one of the split friction road surface condition or the black ice road surface condition, determine to brake the vehicle, wherein the processor is configured to control an operation of the braking device based on ABS control if it is determined to brake the vehicle and controls an operation of the steering device based on a counter steer control, wherein the processor sets an inter-vehicle distance for a smart cruise control to a maximum distance and sets a following speed of the vehicle for the smart cruise control to a road surface limit speed to control the operation of the vehicle, and wherein the processor is configured to, if determining that the determined road surface condition is not at least one of the split friction road surface condition or the black ice road surface condition, determine not to brake the vehicle.

* * * * *